June 5, 1962 T. GEFFNER ET AL 3,037,805
STORE SUPPORTING AND EJECTING ASSEMBLY FOR AIRCRAFT
Filed Aug. 22, 1957 3 Sheets-Sheet 1
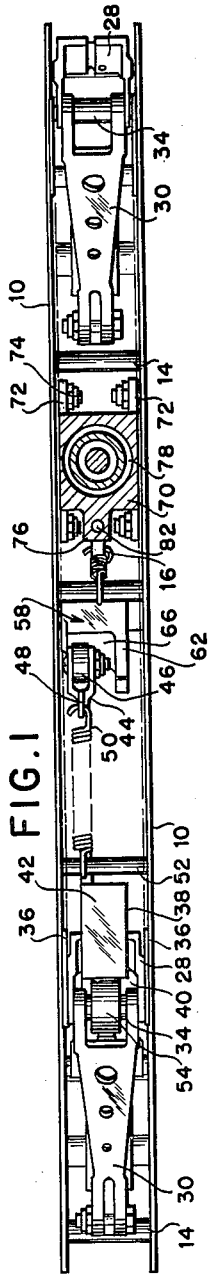
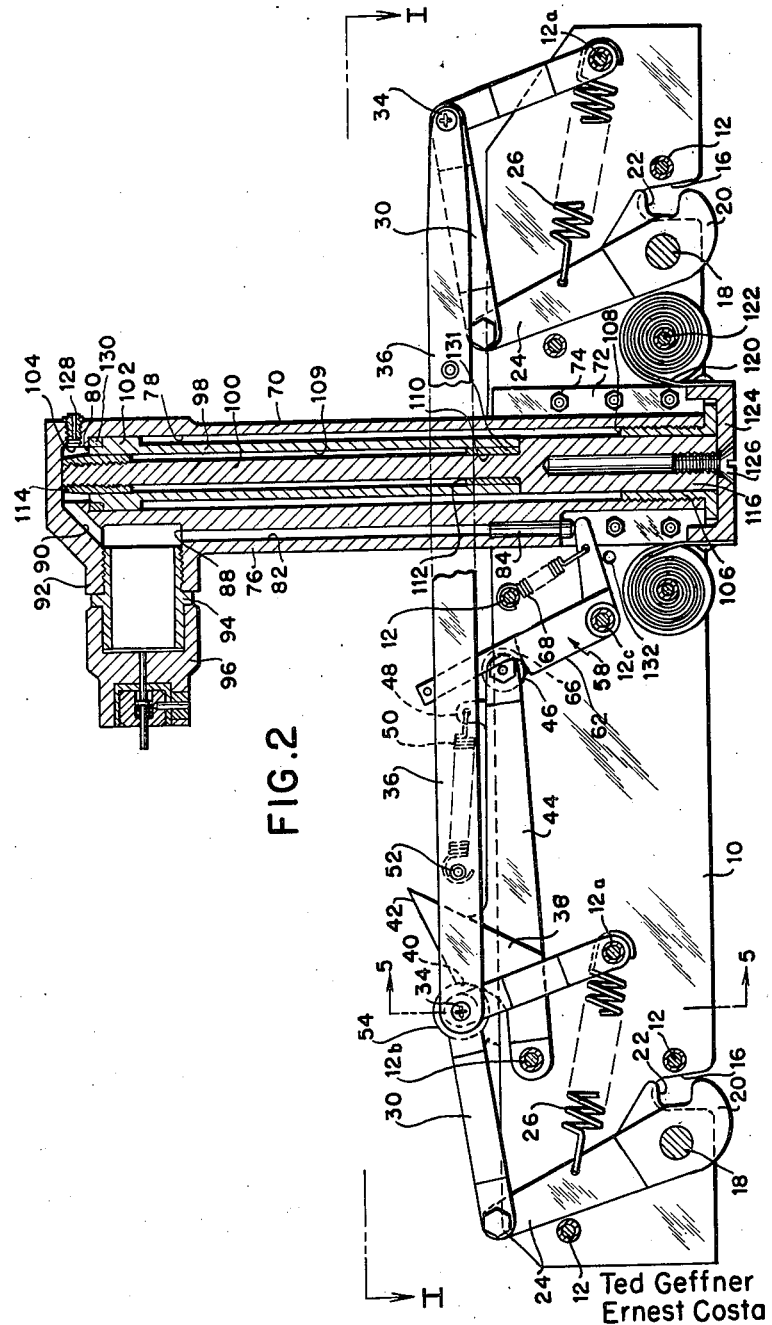
Ted Geffner
Ernest Costa
INVENTORS Ted Geffner
Ernest Costa
INVENTORS June 5, 1962 T. GEFFNER ET AL 3,037,805
STORE SUPPORTING AND EJECTING ASSEMBLY FOR AIRCRAFT
Filed Aug. 22, 1957 3 Sheets-Sheet 3

Ted Geffner
Ernest Costa
*INVENTORS*

BY
ATTORNEY

United States Patent Office 3,037,805
Patented June 5, 1962

3,037,805
STORE SUPPORTING AND EJECTING ASSEMBLY FOR AIRCRAFT
Ted Geffner, 3825 Hampton Road, Pasadena, Calif., and Ernest Costa, 4319 Gunther Ave., New York, N.Y.
Filed Aug. 22, 1957, Ser. No. 680,033
19 Claims. (Cl. 294—83)

The present invention relates to store supporting and ejecting assemblies for use on aircraft and more particularly to an improved assembly of this type featuring a light-weight powerful gun unit especially adapted for use with modern high speed aircraft. The present application is a continuation-in-part of our application for United States Letters Patent, Serial No. 503,480, filed April 25, 1955, now abandoned for Store Supporting and Discharging Rack for Aircraft.

Store supporting and releasing mechanisms for use on aircraft and especially designed to release missiles, fire bombs, jettisonable fuel tanks and other stores have been in general use and have achieved moderate success particularly on the slower speed aircraft of a few years ago. However, the development of more modern, supersonic aircraft and the adoption of more complex and heavier loads to be released therefrom have introduced serious problems for which prior mechanisms are inadequate and unsatisfactory. For example, it is of the greatest importance with supersonic craft to employ very powerful fast-acting means for ejecting the store from the aircraft simultaneously with or immediately following its release by the retaining mechanism. The only satisfactory energy source so far found is that provided by an explosive charge capable of generating very high pressures almost instantaneously. In addition, means must be employed for utilizing these high pressures effectively and reliably.

It has been proposed heretofore to utilize explosive charges to actuate ejector mechanisms overlying the store and acting in a manner intended to expel the store from the aircraft upon release from the retaining shackle mechanism. Results so far achieved with such mechanisms have been erratic and unpredictable, characteristics which are intolerable in aircraft operations. Additionally, the available power has been pitifully inadequate and the required components utilizing the explosive energy have been so heavy and bulky as to create serious problems in the design and operation of aircraft.

The present invention seeks to obviate the foregoing and other serious disadvantages of prior structures and to provide a unitary compact assembly having far greater effective power, and yet being several times lighter in weight than any prior related mechanism for the same purpose. The gun proper is built into and forms an integral part of the store retaining and releasing shackle mechanism. This gun has two independent barrels, one of which houses a telescoping store-ejecting plunger assembly normally held fully retracted within the gun by novel spring means and the other of which encloses the fast-acting smaller plunger for actuating the store release mechanism. Both plunger systems are arranged to be activated sequentially from a common explosive charge containing chamber having restrictive communication with both plunger chambers. The relatively small explosive charge chamber is built to withstand very high instantaneous pressures. This feature coupled with the restrictive passages communicating with each plunger chamber makes it possible to restrict greatly the thickness and weight of the walls of the gun proper, this objective being further aided by the fact that both plunger systems are arranged to move outwardly as the explosion products pass into the plunger chambers. Another feature is the use of light-weight high-strength alloys having high heat conductivity and heat dissipating properties, thereby further minimizing the instantaneous pressure within the plunger chambers and making it feasible to cut the weight still further without hazard to the craft or to the crew.

Another feature of the design is the use of special materials in certain parts of the gun exposed to high stress, high friction and the deleterious and corrosive effects of combustion products from explosive charges.

Accordingly, it is a primary object of the present invention to provide an improved light-weight, high-strength, positive-acting, highly reliable store supporting and ejecting mechanism for use on aircraft, and particularly craft operating at supersonic speeds.

Another object of the invention is the provision of a light-weight ejector gun assembly having independent plunger systems, one of which is effective to release the store and the other of which is effective to eject it away from the shackle mechanism.

Still another object of the invention is the provision of a powerful store ejecting gun having a single explosive charge chamber provided with separate restrictive passages in communication with independent plunger chambers and wherein the restrictive means are so designed that the separate plungers are actuated sequentially in a predetermined timed relationship.

Another object of the invention is the provision of an ejector gun assembly having a main telescoping plunger assembly locked in assembled relation within the gun barrel and featuring special spring means for holding the plunger normally retracted within the gun barrel and operative to return the plunger to its retracted position automatically, following the firing of the gun.

Another object of the invention is the provision of a powerful linear motor operated by the burning of a charge of explosive material and including plungers actuated thereby having components resistant to friction and to the corrosive atmospheres resulting from burning explosive materials.

These and other more specific objects will appear upon reading the following specification and claims and upon considering in connection therewith the attached drawings to which they relate.

Referring now to the drawings in which a preferred embodiment of the invention is illustrated:

FIGURE 1 is a transverse sectional view taken along line I—I of FIGURE 2;

FIGURE 2 is a longitudinal sectional view through the store retaining and ejecting mechanism and showing the parts in the position occupied when a store is locked in place therein;

Figure 3:
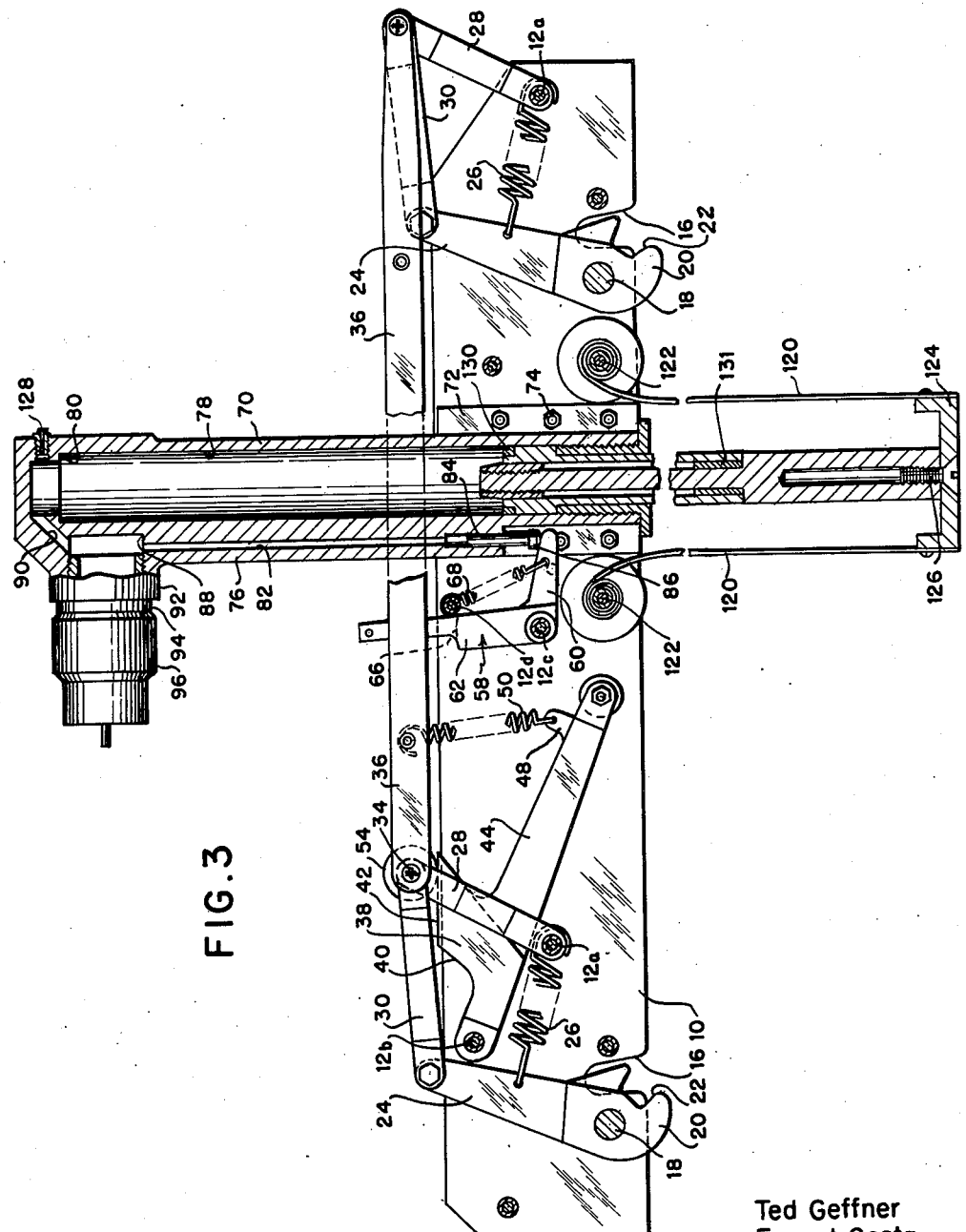
FIGURE 3 is a view similar to FIGURE 2 but showing the parts in a position occupied immediately following release of the store and the partial extension of the gun to eject the store from the aircraft.

Referring now more specifically to FIGURES 1 and 2, there is shown a shackle mechanism having a pair of slide plates 10 of a suitable high-strength aluminum alloy held in spaced parallel relation by a plurality of bolts 12 and spacer sleeves 14. Each of plates 10 is formed with pairs of aligned notches 16 in its lower edge for receiving and seating the eye or other support for a store, not shown. Secured between plates 10 to one side of each notch 16 is a bolt 18 pivotally supporting a strong hook 20, each having a notch 22 cooperating in known manner with notches 16 to hold captive or to release the handling eye of a store depending upon the pivoted position of hook 20. Thus, when the hooks are pivoted counterclockwise to the position shown in FIGURE 2, the handling eye of a store is positively locked in place in notch 16. However, when hook 20 is pivoted clockwise to the position shown in FIGURE 3, the handling eye of the store is free to drop out of notch 16. It will be understood that the bolts 18 serving as pivots for hooks 20 may project beyond the lateral sides of plates 10 and into hangers or other appropriate means carried by the aircraft for supporting the shackle mechanism.

Each hook 20 includes an upwardly projecting arm 24 to the mid-portion of which is attached one end of a tension spring 26, the other end being engaged over the spacer sleeve of bolt 12a. Accordingly, springs 26 are effective to pivot the hooks clockwise against a stop provided by shackle assembly bolts 12b. The means for locking hooks 20 pivoted counterclockwise to their store retaining position as illustrated in FIGURE 2 comprises a linkage extending generally horizontally adjacent the upper edges of plates 10. This linkage includes a pair of U-shaped yokes 28 having their lower ends or bight portions pivoted on bolts 12a (see FIGURE 3). Pairs of relatively short heavy duty links 30 have one end of each pivotally connected to the upper ends of yokes 28 as by means of a through-bolt 34, the other ends of links 30 being pivotally connected to the left-hand one of hooks 20 as viewed in FIGURES 2 and 3. A pair of long links 36 have their ends pivoted to bolts 34 of the two yokes 28. From the foregoing, it will be understood that hooks 20 pivot in unison with linkage members 30, 36 and with yokes 28.

The mechanism for locking and unlocking the shackle linkage and associated hooks 20 comprises a heavy duty pawl 38 pivoted to through-bolt 12b and having a suitable shape corresponding generally to that shown in the drawings. This pawl includes a cammed shoulder 40 merging with a straight edge 42, the cammed shoulder 40 providing a trackway and locking detent for a roller 54 rotatably supported on the left-hand one of through-bolts 34 and cooperable therewith to prevent clockwise rotation of the hooks and the linkage when positioned as shown in FIGURE 2.

The shackle linkage is adapted to be retained positively in locked position by means including an extension 44 on pawl 38 and having a roller 46 supported in its free end adapted to be supported on shoulder 66 of an L-shaped pawl 58. This pawl is pivotally mounted on a through-bolt 12c with its shorter leg 60 projecting into the path of an actuating plunger 86 slidably supported in a small bore barrel 84 of the gun mechanism to be described presently. Pawl 58 is urged counterclockwise by a coil spring 68 having one end connected to arm 60 and its other end suitably supported as on bolt 12d. Pawl 38 is urged to pivot counterclockwise about pivot 12b by tension spring 50 having one end connected to an extension 48 of the pawl and its other end hooked around a pin 52 interconnecting links 36.

In the unlocked position of the shackle, roller 54 rides along flat surface 42 of the pawl in a manner pivoting the pawl clockwise and tensioning spring 50. However, when the linkage is pivoted to the left, roller 54 rides off surface 42 onto the shoulder 40 allowing spring 50 to move pawl 38 upwardly as roller 46 rolls along the left-hand edge of pawl 58 forcing the pawl to pivot clockwise until roller 46 rides onto shoulder 66. Spring 68 then pivots the pawl counterclockwise locking the pawl against clockwise movement. In this position shoulder 40 is locked to the right of roller detent 54 of the linkage thereby positively locking hooks 20 in their store retaining position as is illustrated in FIGURE 2.

The gun mechanism employed both to unlock the shackle and to eject the released store forms an important component of the present invention and is preferably constructed in the manner now to be described. The main body of the gun comprises an elongated tubular barrel or cylinder block 70 preferably rectangular in cross-section and sized to fit snugly between side plates 10, 10. The lower end of the barrel is provided with flanges 72 having holes through which mounting bolts 74 are received for rigidly mounting the gun assembly between plates 10 of the shackle mechanism. Extending longitudinally along one side of barrel 70 is an extension accommodating a restrictive passage 82 opening at its lower end into a small diameter bore 84 in which is slidably supported the pawl release plunger 86.

The upper end of the restrictive passage 82 opens into the inner end of an explosive charge chamber 88 having an axis here shown as extending at right angles to the axis of the gun barrel. The outer portion of chamber 88 is threaded to seat a nipple 94 closed at its outer end with a very strong closure cap 96 seating at its axis any suitable type of charge detonating device of conventional design. Cap 96 and nipple 94 can be removed as a unit for servicing and for fitting therewithin a suitable explosive charge so arranged as to be detonated by the detonating device. It will be understood that the heavy wall 92 in which explosive chamber 88 is formed and the cooperating nipple 94 and attached cap 96 are sufficiently thick and strong as to withstand with an adequate safety margin the highest instantaneous pressures likely to be generated in the operation of the gun.

Leading from the explosive charge chamber is a second restrictive passage 90 which opens into the upper end of cylindrical bore 78 of the main gun barrel. The upper end of this bore has a shoulder 80 serving as a stop for the larger diameter section of the store ejector plunger means as will be described more fully presently. It will be understood that the diameters of restrictive passages 82 and 90 are important both relative to one another and to the plunger passages into which they open since it is the effective restrictive characteristics of these passages which control the proper sequential operation of the two plunger systems. Suffice it to say at this time that the build-up of gas pressure in bore 84 for plunger 86 must be such as to actuate this plunger to actuate pawl 58 and release hooks 20 preferably prior to and, in all events, not later than the extension of the store ejecting plunger.

Figure 4:
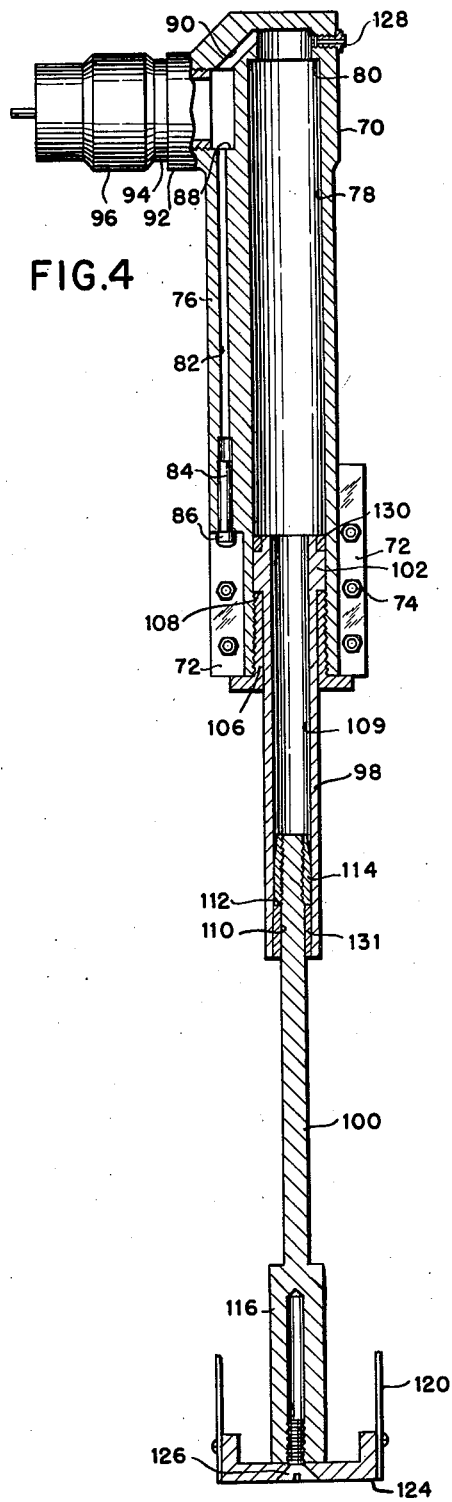
FIGURE 4 is a longitudinal sectional view through the gun and plunger system when fully extended.
Figure 5:
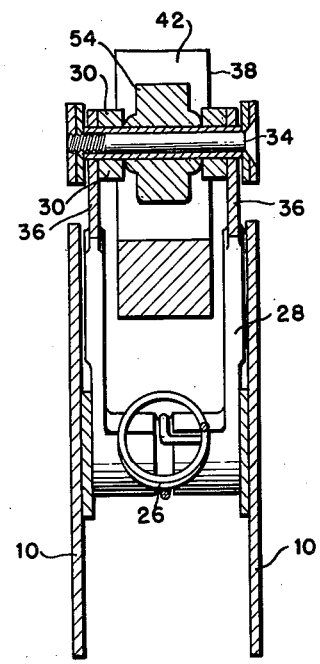
FIGURE 5 is a transverse sectional view on line 5—5 of FIGURE 2.

The store ejector ram or plunger assembly comprises an outer tubular sleeve 98 having an enlarged inner end or piston head 102 forming a close sliding fit with the main gun barrel 78. This sleeve slidably supports a piston rod 100 having a threaded upper end supporting a combined piston head and bearing ring 114 of special material. A ring 110 of the same material is suitably secured to the inner wall of sleeve 98 and has a close sliding fit with the accurately finished surface of piston rod 100. The enlarged lower end 116 of rod 100 provides a shoulder at its upper end against which the adjacent end of sleeve 98 abuts during the retractive movement of the plunger assembly. End 116 has a threaded axial bore seating a screw 126 holding the ejector head 124 secured to the inner stage of the plunger. The accurately finished outer surface of end 116 has a close sliding fit with the inner wall of a bushing 106 screw fitted into the lower end of the gun barrel and serving to hold the plunger assembly in place in the gun barrel. The inner end of bushing 106 forms a stop against which piston head 102 abuts to limit the outward extension of the plunger upon firing of the gun, the fully extended position being shown in FIGURE 4. As is shown in this figure, bearing rings 114 and 131 cooperate to limit the outward extension of piston rod 100 relative to sleeve 98.

An important feature of the gun design and particularly of the plunger assembly is the use of special material for bearing ring 130 at the upper outer corner of piston 102, for rings 114, 131 and for bushing 106, this material being found to be highly effective in resisting corrosion and attack by the products of combustion of the explosive material. Furthermore, the materials of which these rings are made are found to have high strength and excellent wear-resisting qualities particularly in combination with the high-strength light-weight aluminum alloy used in fabricating the other principal parts of the gun assembly. The alloy found particularly suitable for this purpose is known under the trade name of Ampco and has a copper base alloyed with 10 to 11.2 percent of aluminum, 3.0 to 4.25 percent iron, and a maximum of 0.5 percent of other metals. This material is used at points first contacted by the very hot and still burning products of combustion. While the plunger assembly has close fitting engagement with the cooperating walls of the gun, still the high pressure gases leak past these surfaces while very hot and still burning. Due to the movement of the piston heads relative to the aluminum alloy comprising the principal material of the gun barrel, no serious attack occurs on these and the plunger parts are found to be protected to a highly satisfactory degree if the special bearing material described above is employed in the places and to the limited extent illustrated in the drawings. It will be appreciated that the axial length of ring 130 may be increased to advantage although the short axial length here illustrated is found generally adequate.

There remains to be described a further important subcomponent of the assembly, this being the automatic plunger retractor mechanism comprising a pair of identical negator springs 120. These springs comprise long strips of resilient materials specially formed in known manner and having the lower end of each fixed to diametrically opposite sides of the ejector head 124. The upper ends of the spring strips are coiled about and secured to separate spools rotatably supported on shafts 122 mounted between side plates 10 of the shackle mechanism. It will be understood that these springs are so designed that upper ends tend to rotate the spools in opposite directions on shaft 122 in a direction to retract the plunger assembly entirely within barrel 78 in opposition to its weight and to the very considerable resistance offered by the close fitting sliding surfaces. The importance of the retractor lies in the fact that once the gun has been fired to extend the plunger it is important that the plunger be fully retracted to avoid the possibility of damage to its parts and to eliminate the drag effect produced by the extension of these parts into the air slipstream of high speed aircraft. The upper end of the main gun barrel is preferably provided with a very small bore vent device 128 which allows the high pressure gases to bleed from the gun following firing thereby enabling the retractor springs 120 to retract the plunger within the gun barrel.

The operation of the described shackle and store ejector mechanism will be quite apparent from the foregoing detailed description of its structure. Initially and prior to arming, the position of the shackle mechanism parts will be that shown in FIGURE 3. At the same time, springs 120 will hold the plunger or ram assembly retracted within the gun barrel. The store is automatically locked to the shackle by elevating it until its supporting eyes engage against the upper side wall of notch 22 in hooks 20. Continued elevation of the store and its eyes acts to cam the hooks counterclockwise in opposition to springs 26 until these occupy the position illustrated in FIGURE 2. The counterclockwise movement of hooks 20 acts through links 30 to pivot them to the left as viewed in FIGURE 2 carrying detent roller 54 and allowing pawl 38 to move counterclockwise in opposition to spring 50 until the roller rides down along cam shoulder 40 and as pawl roller 46 rides onto shoulder 66 of pawl 58.

It will therefore be evident that the mere elevation of the store into notches 16 and 22 automatically effects the positive locking of the store within these notches and the latching of the pawl in such a position as to hold its actuating plunger 86 fully retracted within its supporting bore 84. So long as the pawl remains rotated counterclockwise to the position shown in FIGURE 2, it is impossible for the store to be released. However, relatively little energy is required to pivot the pawl clockwise thereby releasing pawl 38 and associated hooks 20. To provide positive and absolute protection against this occurring accidentally, the shackle side plates 10 are provided with aligned holes 132 immediately below arm 60 of the pawl. The insertion of a safety pin through holes 132 provides absolute protection against accidental or premature release of the store until the safety pin is retracted from holes 132. The shackle mechanism is now fully armed and protected by the safety pin.

The gun is prepared for firing by removing cap 96 and thimble 94 so that an appropriate charge of explosive can be placed in chamber 88. After this chamber is charged and tightly closed, suitable firing means such as a high voltage terminal is connected to the outwardly projecting firing terminal of the detonator whereupon the gun is armed and ready for action. All that remains is to remove the safety pin from openings 132 and to close the electrical circuit.

After the bombardier or other crewman has determined the exact moment to release the bomb or other store, the safety pin is removed and the firing circuit is closed. Instantly a very high pressure is developed within chamber 88. This pressure is communicated through restrictive passages 82 and 90 into the respective plunger barrels 84 and 78. Owing to the carefully selected sizes of the restrictive passages relative to plunger bores 84 and 78, the pressure communicated to bore 84 is effective to actuate plunger 86 prior to any appreciable extension of the ejector plunger. The described extension of plunger 86 acts to rotate pawl 58 clockwise away from roller 46 and allowing the latter to roll off shoulder 66 and permitting pawl 38 to pivot clockwise so that detent roller 54 rides onto surface 42 of the pawl. Springs 50 and 26 are then effective to rotate hooks 20 clockwise releasing the store from notches 16. As this is taking place, the high pressure simultaneously building up in main gun bore 78 acts to extend pistons 98 and 100 to drive ejector head 124 against the upper side of the store with tremendous force and at high velocity. In consequence, the released store is projected away from the aircraft at a sufficient velocity to avoid any possibility of the store contacting portions of the craft rearwardly thereof.

Some of the products of combustion escape past the side walls of the plunger system while others escape slowly through vent 128 at the top of the gun barrel. The venting of these gases to the atmosphere permits the negator springs 120 to recoil and retract the plunger fully within the gun barrel. Springs 26 act to hold the shackle linkage securely in its fully opened release position in instant readiness to be reloaded and recocked whenever a new store is elevated into notches 16.

While the particular store retaining and release mechanism in combination with a store ejector gun herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:
1. A store supporting and discharging rack for aircraft, comprising a frame, including a pair of spaced, parallel plates, each of said plates having a pair of spaced, upwardly extending notches in its lower edge in register with the corresponding notches in the other of the plates, a hook member pivotally mounted intermediate said plates adjacent each pair of registering notches and having a slot formed therein, each of said hooks arranged to be movable to have its slot brought into transverse register with the adjacent pair of registering notches in one, store retaining position, and to have its slot opening brought into register with the openings of the adjacent registering notches in another, store releasing position, resilient means for automatically urging said hooks into store releasing position, releasable means counterbalancing said resilient means and maintaining said hooks in store retaining position and means for releasing said last named means and simultaneously eject the released stores away from said rack, including an L-shaped lever pivoted by its corner intermediate said plates, said lever having one arm operative to maintain said hooks in store supporting position on one position thereof, spring means engaging the second arm of said lever to move said first arm into said position thereof, a cylinder block mounted in upright position intermediate said plates adjacent the second arm of said lever, said block having an extension overhanging the free end of said second lever arm and adapted to limit its movement in the spring urged direction, said extension having a longitudinal passageway formed therein opening into the bottom thereof and having a piston slidably disposed in the bottom portion thereof, said passageway connected at its top to a compressed fluid chamber provided at the upper end of said block, said cylinder block having a cylinder bore formed therethrough opening into the bottom thereof and terminating short of its top and having a portion of reduced diameter at its top forming an air space, a passageway connecting said air space with said compressed fluid chamber, a ram disposed within said bore and movable outwardly thereform under pressure from fluid from said chamber, and means for retaining said ram within said bore when in extended position therefrom.

2. The aircraft store rack of claim 1, wherein means are provided for automatically returning said ram into said cylinder bore when said fluid pressure is spent.

3. The aircraft store rack of claim 1, wherein said ram is telescopic.

4. The aircraft store rack of claim 1, wherein said ram comprises an outer sleeve member of lesser height than said bore and movable therewithin, and an inner rod portion within said sleeve portion, said rod portion having a thinner portion fitting within said sleeve portion and of greater length than said sleeve portion to extend into said air space and contact the roof thereof and having a thicker lower portion engageable by the lower edge of said sleeve portion, means for retaining the inner end of said sleeve portion within said cylinder bore and means for retaining said inner end of said rod portion within said sleeve portion.

5. The aircraft store rack of claim 1, wherein said ram is telescopic and wherein means are provided for telescopically returning said ram into said cylinder bore when said fluid pressure is spent.

6. The aircraft store rack of claim 1, wherein said ram is telescopic and wherein means are provided for automatically telescopically returning said ram into said cylinder bore when said fluid pressure is spent, comprising spring wound spools, a strap connected by one end and wound upon each of said spools, each of said straps connected by its other end to the innermost telescoping member of said ram.

7. A store supporting and releasing rack for aircraft, comprising hook means movable into store engaging and store releasing position, tension means for automatically urging said hook means into store releasing position, means movable to resist said tension means and to retain said hook means in store engaging position including an L-shaped pawl pivotally mounted at its corner, means for moving said pawl out of store engaging position and for simultaneously ejecting the stores released by said hook means from said rack comprising a cylinder block mounted adjacent said pawl, said block having a portion overhanging the end of one arm of said pawl in close proximity thereto, said block portion having a passageway formed therethrough opening above the end of said pawl arm and having a piston responsive to fluid pressure in the passageway for movement against said pawl arm end, said block having a cylinder bore formed therethrough opening into one end thereof and terminating short of its other end, said cylinder bore having an inner extension of lesser diameter forming an air space, said block having a transverse bore formed in the wall thereof adjacent its closed end, said bore transecting said extension passageway and extending partly into the wall of the said cylinder bore, forming a recess therein, a passageway connecting said recess with said air space, a ram reciprocably disposed within said cylinder bore below said air space and means interengaging the inner end of said bore with the outer end of said cylinder bore to prevent complete withdrawal of said ram from said bore.

8. The store supporting and releasing rack of claim 7, wherein said transverse bore is provided with a threaded outwardly extending flange, a tube is threaded by one end on said flange and a cap is removably secured to the other end of said tube, said recess, said tube and said cap forming a chamber for an explosive cartridge, and said cap having means associaed therewith for exploding said cartridge within said chamber.

9. The store supporting rack for aircraft of claim 7, wherein said block is formed of aluminum alloy and said ram includes an aluminum alloy outer section and wherein bushings are provided at the upper end of said ram and the lower end of said cylinder bore said bushings comprising an alloy of copper containing between 10.00 and 11.20 percent of aluminum, between 3.00 and 4.25 percent of iron and a maximum of 0.50 percent of other materials.

10. The store supporting and releasing rack of claim 7, wherein said block is formed of aluminum alloy and wherein said ram is telescopic and includes an outer sleeve of aluminum alloy and a rod telescoping within said sleeve, the upper end of said sleeve, the lower end of said cylinder bore, the upper end of said rod and the lower end of the interior of said sleeve each having a bushing formed of an alloy of copper containing between 10.00 and 11.20 percent of aluminum, between 3.00 and and 4.25 percent of iron and a maximum of 0.50 percent of other material.

11. In a store supporting and discharging rack for aircraft, including a frame and a pawl pivotally supported on said frame for movement in and out of store supporting position, means for moving said pawl out of store supporting position and simultaneously discharging the released stores, comprising a first cylinder open at one end and mounted on said frame with its open end adjacent to and in substantial register with said pawl and a plunger disposed in said first cylinder for outward movement outwardly against said pawl, and a second cylinder open at one end and mounted on said frame with its open end over said stores and a ram disposed in said second cylinder for movement against said stores, each of said cylinders having a free space at its inner end and inlet for compressed fluid formed in the wall thereof and opening in said space.

12. The store supporting and discharging rack of claim 11, wherein both of said inlets for compressed fluid open into a common chamber for compressed fluid.

13. The store supporting and discharging rack of claim 11, wherein means are provided for automatically returning said ram into said second cylinder when said fluid pressure is spent.

14. The store supporting and discharging rack of claim 11, wherein said ram comprises a plurality of telescopically arranged elements with means on said cylinder and the outermost of said telescopic elements for interengaging one with the other to prevent the withdrawal of the said outermost member from said cylinder and cooperating interengaging means on said telescoping elements for preventing the withdrawal of each from the other.

15. The store supporting and discharging rack of claim 11, wherein both of said cylinders are formed in a unitary block.

16. The store supporting and discharging rack of claim 11, wherein both of said cylinders are formed in a unitary block, and wherein said block is provided with a chamber for compressed fluids, said inlets opening into said chamber.

17. A store supporting and discharging rack for aircraft, comprising a frame, including a pair of spaced, parallel plates, each of said plates having a pair of spaced, upwardly extending notches formed in its bottom edge in register with the corresponding notches in the other of the plates, a hook member pivotally mounted intermediate said plates adjacent each pair of registering notches, said hook members mounted to a corresponding side of the adjacent registering notches and each having a slot formed therein opening into a side edge thereof and arranged to have its hook slot in transverse register with the adjacent registering notches in one position of the hook member and have its slot opening in register with the openings of said registering notches in a second position of said hook member, resilient means between said plates urging said hook members into said second position, link means interconnecting said hook members for simultaneous movement from one position to the other, said link means comprising a U-shaped yoke associated with each of said hook members and pivotally supported by its base intermediate said plates to the opposed side of the adjacent registering notches from the associated hook member, an arm pivotally connected by one end to an end of each of said hook members, said arm having its other end forked and connected by the ends of its fork arms by a transversely disposed pin to the end of the arms of the adjacent yoke, and link bar pin means connecting the ends of said transverse pivot pins, a pawl having a shoulder pivotally supported by one end intermediate said plates, resilient means connecting the free end of said pawl to said link bar means to thereby raise said pawl end when said link bar means are moved to dispose said hook members in said first position, said pawl and said shoulder arranged to engage one of said transverse pivot pins when said free pawl end is in raised position, and trigger means releasably supporting said free pawl end in raised position to maintain said hook members in said first position.

18. A store supporting and discharging rack for aircraft, comprising a frame, including a pair of spaced, parallel plates, each of said plates having a pair of spaced, upwardly extending notches formed in its bottom edge in register with the corresponding notches in the other of the plates, a hook member pivotally mounted intermediate said plates adjacent each pair of registering notches, said hook members mounted to a corresponding side of the adjacent pair of registering notches and each having a slot formed therein opening into a side edge thereof and arranged to have its hook slot in transverse register with the adjacent pair of registering notches in one position of the hook member, and to have its slot opening in register with the openings of said registering notches in a second position of said hook member, resilient means between said plates engaging and urging said hook members into said second position, a U-shaped yoke associated with each of said hook members, said yoke pivotally supported by its base intermediate said plates to the opposed side of the adjacent registering notches from the associated hook member, an arm pivotally connected by one end to each of said link members and by its other end, by means of a transversely extending pin, to the ends of the adjacent yoke arms, link bar means connecting the said transverse pins, a pawl having a shoulder pivotally supported by one end intermediate said plates, resilient means connecting the free end of said pawl to said link bar means to thereby raise said pawl end when said link bar means are moved to dispose said hook members in said first position, said pawl and said shoulder arranged to engage one of said transverse pins when said free pawl end is in raised position, and trigger means releasably supporting said free pawl end in raised position to maintain said hook members in said first position.

19. A store supporting and discharging rack for aircraft, comprising a frame, including a pair of spaced parallel plates, each of said plates having a pair of spaced, upwardly extending notches formed in its bottom edge in register with the corresponding notches in the other of the plates, a hook member pivotally mounted intermediate said plates adjacent each of said pairs of registering notches, said hook members mounted to a corresponding side of the adjacent pair of registering notches and each having a slot formed therein opening into a side edge thereof and arranged to have its said slot in transverse register with the adjacent registering notches in one position of the hook member and to have its slot opening in register with the openings of the adjacent registering notches in another position of said hook member, resilient means between said plates engaging and urging said hook members into said second position, link means interconnecting said hook members for simultaneous movement from one position to the other, said link means including a transversely disposed element, a pawl having a shoulder pivotally supported by one end intermediate said plates, resilient means connecting the free end of said pawl to said link means to thereby raise said pawl end when said link means are moved to dispose said hook members in said first position, said pawl and said shoulder arranged to engage said transverse element when said free pawl end is in raised position, an L-shaped trigger lever pivotally supported by its corner intermediate said plates, one of the arms of said lever formed with a shoulder and arranged to have said shoulder engage said free pawl end for supporting it in raised position, the other end of said lever arm directed away from said pawl, spring means engaging said second lever arm for tilting said first lever arm into pawl supporting position and means limiting the movement of said first lever arm beyond pawl supporting position, including an upright cylinder block overhanging and adapted to engage against the free end of said second lever arm when said first lever arm is in pawl supporting position, said block having a longitudinally extending passageway therethrough and having a piston disposed in the end of the passageway adjacent said second lever arm and in contact therewith, said passageway connected at its other end to a source of compressed fluid, whereby said piston, when under the pressure of said fluid will press against the end of said second lever arm to tilt said lever and move said first lever arm out of pawl supporting position.

References Cited in the file of this patent

UNITED STATES PATENTS

| | | |
|---|---|---|
| 2,096,002 | Moreira et al. | Oct. 19, 1937 |
| 2,135,888 | Febrey | Nov. 8, 1938 |
| 2,435,639 | Stockton | Feb. 10, 1948 |
| 2,497,084 | Irby | Feb. 14, 1950 |
| 2,516,902 | Musser | Aug. 1, 1950 |
| 2,533,379 | Knezo | Dec. 12, 1950 |
| 2,736,522 | Wilson | Feb. 28, 1956 |
| 2,749,063 | Low | June 5, 1956 |
| 2,756,091 | Komerska | July 24, 1956 |
| 2,830,841 | Benson et al. | Apr. 15, 1958 |
| 2,856,224 | Kelly et al. | Oct. 14, 1958 |
| 2,857,890 | Statt | Oct. 28, 1958 |
| 2,869,426 | Wilkie | Jan. 20, 1959 |
| 2,869,523 | Murphy | Jan. 20, 1959 |